No. 622,955. Patented Apr. 11, 1899.
F. H. KELLEY.
PHOTOGRAPHIC SHUTTER.
(Application filed Dec. 31, 1895.)

(No Model.)

Attest
George H. Botts.
C. J. Sawyer

Inventor:
Frederick H. Kelley
By Philipp Mumm Wheep
Attys

UNITED STATES PATENT OFFICE.

FREDERICK H. KELLEY, OF PROVIDENCE, RHODE ISLAND, ASSIGNOR TO THE EASTMAN KODAK COMPANY, OF ROCHESTER, NEW YORK.

PHOTOGRAPHIC SHUTTER.

SPECIFICATION forming part of Letters Patent No. 622,955, dated April 11, 1899.

Application filed December 31, 1895. Serial No. 573,869. (No model.)

*To all whom it may concern:*

Be it known that I, FREDERICK H. KELLEY, a citizen of the United States, residing at Providence, county of Providence, and State of Rhode Island, have invented certain new and useful Improvements in Photographic Shutters, fully described and represented in the following specification and the accompanying drawings, forming a part of the same.

This invention relates to an improved photographic shutter adapted especially for use in cameras employing film or in detective cameras, although it may be used also in cameras of other forms, the especial object of the invention being to provide a more simple, efficient, and durable shutter-operating mechanism.

To this end the invention consists, broadly, in the combination, with a photographic shutter, of a motor-spring energized to operate the shutter and a thumb-piece or other suitable operating member for energizing the spring carrying a detent which coacts with the shutter to hold the latter while the spring is being energized and releases the shutter for its movement by the energized spring.

A further object of the invention is to provide an improved camera-shutter mechanism adapted for convenient use either for instantaneous or time exposure.

The invention includes, in addition to the broad feature above pointed out, various features of construction and combinations of parts, all of which will be fully described in the following specification and pointed out in the claims.

For a full understanding of the invention a detailed description of a construction embodying all the features of the same in their preferred form will be given in connection with the accompanying drawings, forming a part of this specification, in which—

Figure 1:
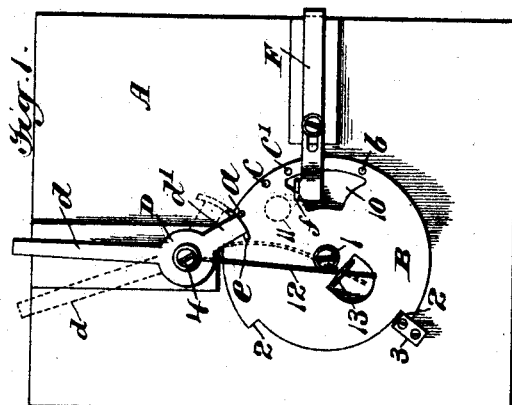
Figure 2:
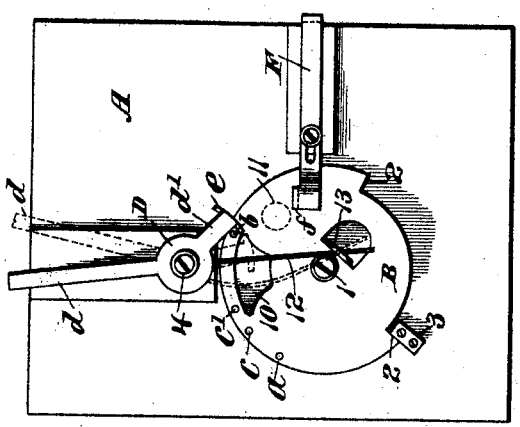
Figure 4:
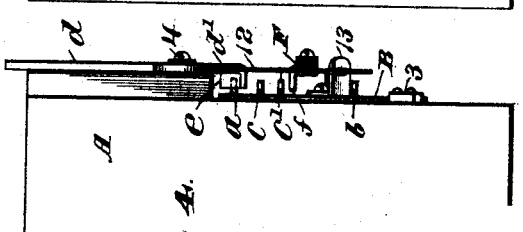
Figure 3:
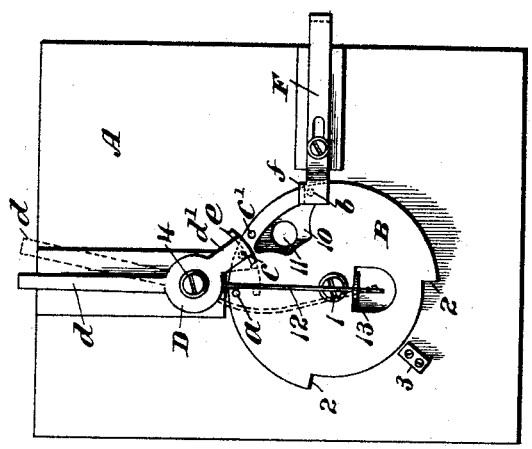

Figure 1 is a face view of the shutter and its operating mechanism in one of its two positions when closing the lens-opening, the position of the parts when the thumb-piece has been actuated so that the detent has just released the shutter for instantaneous exposure being shown in dotted lines. Fig. 2 is a similar view, but showing the shutter in its other position of closing the lens-opening. Fig. 3 is a face view of the shutter and its operating mechanism in position with the lens-opening uncovered for time exposure, the position when the detent has just released the shutter for its return to close the lens-opening being shown in dotted lines. Fig. 4 is an edge view of the shutter mechanism, looking from the left in Fig. 1.

In the drawings, A is the support for the shutter, which may consist of a separate plate, camera-front, or lens-support and upon which is mounted the shutter B, consisting in the form shown of an approximately circular plate loosely mounted to oscillate upon a pivot consisting of a pin or screw 1. The shutter is provided upon one side with the exposing-aperture 10, arranged to coincide with the lens-opening 11 in the diaphragm or support A when the shutter is in the proper position and preferably provided at its edge with notches 2, coacting with a fixed stop 3 on the lens-support A to positively determine the limit of movement of the shutter.

The shutter B carries a series of stops which, in the construction shown and as is preferred, project outward from its surface near the edge and are shown as formed by pins, *a b* being the two end pins of the series and *c c'* intermediate pins. The motor-spring 12 is connected to the shutter at a point at one side of the center, so as to throw the shutter in opposite directions when put under tension by being bent to one side or the other, this spring being shown as a round spring threaded through an opening in a projection 13 on the face of the shutter and which may conveniently be formed by striking up a portion of the shutter itself, as shown, although it will be understood that it may be formed in any other suitable manner. The other end of the motor-spring 12 is secured to the operating-lever D near its pivot 4, so as to be bent in opposite directions and put under tension by the movement of the lever, this operating-lever preferably having the usual thumb-piece *d* projecting beyond the camera-support and the detent-arm *d'* extending over the face of the shutter. Upon the inner end of the detent-arm *d'* is carried the detent *e*, which, as shown, consists of a flange or plate extending inward toward the shutter from the arm $d'$, so as to engage and coact with the stop-pins $a$, $b$, $c$, and $c'$, as hereinafter described.

In proper position upon the support A is mounted a stop-arm F, movable into and out of position to engage the pin $b$, this stop-arm F being shown as mounted to slide upon the support and carrying at its inner end a time-exposure stop $f$, projecting inward toward the shutter, so as to engage the pin $b$ when the stop-arm F is moved into the proper position. For instantaneous exposure the stop $f$ is out of position to engage the pin $b$, as shown in Figs. 1 and 2; but by sliding the stop-arm F so as to bring the stop $f$ into the path of the stop-pin $b$ the camera is set for time exposure, this position of the stop $f$ being shown in Fig. 3.

The operation of the construction will be understood from the drawings in connection with the following brief description.

In the position of the parts shown in full lines in Figs. 1 and 4 the camera is set for instantaneous exposure, the shutter B to be thrown to the left from the position shown in Fig. 1, uncovering the lens-opening as it passes from this position to the position shown in Fig. 2. The operating-lever D is now moved by the thumb-piece $d$ from the position shown in full lines in Fig. 1 to that in dotted lines in Fig. 1, thus putting the motor-spring 12 under tension, tending to throw the shutter to the left. During this movement and until the parts are in the position shown in dotted lines in this figure the detent $e$ by contact with the stop-pin $a$ holds the shutter against the tension of the spring 12; but when the parts reach the position shown in dotted lines in this figure the detent $e$ passes beyond the stop-pin $a$, and thus releases the shutter, which is then thrown to the left by the motor-spring 12 and into the position shown in full lines in Fig. 2, in which the shutter is locked against backward movement or movement to the right by the detent $e$, which is returned by the motor-spring 12 into position with its inner surface in engagement with the right-hand side of the stop-pin $b$.

In the construction shown and as is preferred the detent $e$ returns to position to engage the pin $b$ before the tension of the motor-spring 12 is exhausted, so that a rebound of the shutter is first resisted by the tension of the spring, and then before this is exhausted positively prevented by the engagement of the detent $e$ and stop-pin $b$. It will be seen also that by the detent $e$ and the notch 2 on the shutter coacting with the fixed stop 3 the shutter is locked against movement in either direction. One instantaneous exposure has now been made and the shutter is in position for the next exposure, in which the operation is exactly the same as previously described, except that the lever D is moved to the right by the thumb-piece $d$ from the position shown in full lines in Fig. 2 to that shown in dotted lines, putting the motor-spring 12 under tension to throw the shutter to the right, which is done upon the release of the stop-pin $b$ by the passage of the inner surface of the detent $e$ beyond the pin. The position of the parts at the end of the shutter movement from the position shown in Fig. 2 is that shown in Fig. 1, with the detent $e$ holding the shutter against rebound or movement to the left by the engagement of its outer surface with the stop-pin $a$, to which position it preferably returns before the tension of the motor-spring 12 is exhausted. The shutter is then locked against movement in either direction by the notch 2 on the shutter coacting with the stop 3 and by the detent $e$ and stop-pin $a$.

If the shutter is to be used only for instantaneous exposure, it will be understood that the construction is complete without the stop-pins $c\ c'$, as these are not used for instantaneous exposure, and that the stop-arm F and stop $f$ may be omitted. These parts, however, are used for time exposure, in which the operation is as follows: As shown in Figs. 1 and 2, the stop $f$ is inside the line of movement of the stop-pin $b$; but for time exposure the sliding stop-arm F is moved outward, so as to bring the stop $f$ into position to engage the pin $b$, as shown in Fig. 3, and the position of all the parts with the camera set for time exposure is the same as shown in Figs. 1 and 2 except for this change of position of the stop $f$.

For a time exposure the lever D is now moved to the left from the position shown in full lines in Fig. 1 to that shown in dotted lines, when the shutter is thrown as previously described in connection with the instantaneous exposure, except that the shutter is stopped in the position shown in Fig. 3 by the engagement of the stop $f$ with the pin $b$ when the exposure-aperture 10 of the shutter is opposite the lens-opening 11 and the latter thus uncovered for time exposure. In this position of the parts the inner surface of the detent $e$ engages the stop-pin $c$, so as to hold the shutter against movement to the right, while the shutter is held against movement to the left by the stop $f$ engaging the pin $b$ and the shutter thus locked in position for exposure, and the detent $e$ is preferably returned to position to engage the pin $c$ before the tension of the motor-spring 12 is exhausted, so as to prevent rebound, as previously described in connection with the instantaneous exposure, in which the detent $e$ coacts with pins $a\ b$ in the same way. The time exposure being completed, the operating-lever D is moved to the right from the position shown in Fig. 3 by the thumb-piece $d$, thus putting the motor-spring 12 under tension in the same manner as shown in Fig. 2 and as previously described in connection with said figure, and as the detent $e$ passes out of engagement with the stop-pin $c$ the shutter is thrown to the right from the position shown in Fig. 3 and returned to the position shown in Fig. 1, which shows this position of all parts except the stop $f$. On its return movement the shutter is stopped by the engagement of the notch 2 with the fixed stop 3 and locked in position, and rebound prevented by the return of the detent $e$ with its outer surface in engagement with the stop-pin $a$, as shown in Fig. 1.

It is not essential to provide for setting the shutter for time exposure when in either of its extreme positions, and if the shutter is to be set for time exposure when in but one of its two extreme positions only one of the stop-pins $c\ c'$ will be used. It is desirable, however, to provide for setting the shutter for time exposure from either of its extreme positions, and in the construction shown this may be done. It is apparent that if the parts be in the position shown in Fig. 2 and the stop $f$ be moved into the path of the pin $b$ the shutter will be stopped on its movement to the right from the position shown in Fig. 2, with the exposure-opening 10 opposite the lens-opening 11, by the engagement of the stop $f$ with the right-hand side of the stop-pin $b$, and that the detent $e$ will coact with the stop-pin $f$ to lock the shutter against movement to the left during exposure and to release the shutter for its return to the position shown in Fig. 2 by the engagement of the outer surface of the detent with the stop-pin $c'$ in exactly the same manner as by the engagement of its inner surface with the stop-pin $c$ when operated for time exposure from the position shown in Fig. 1.

It will be obvious to those skilled in the art that the stopping and locking of the shutter, secured, in the construction shown, by the notches 2 and the fixed stop 3, may be provided for in any other suitable manner and that various modifications may be made in the construction shown both in the form and arrangement of the shutter and parts forming the operating mechanism without departing from the invention, and I am not to be limited to the exact form or arrangement of the parts of the construction illustrated.

What is claimed is—

1. The combination with a shutter, of an operating member, a motor-spring connecting the operating member and shutter, and a detent on the operating member acting to hold the shutter while the spring is being energized by the operating member and releasing the shutter for its movement by the spring, substantially as described.

2. The combination with a shutter, of an operating-lever, a motor-spring connecting the operating-lever and shutter, and a detent on the operating-lever acting to hold the shutter while the spring is being energized by the operating-lever and releasing the shutter for its movement by the spring, substantially as described.

3. The combination with a pivoted shutter, of an operating member, a motor-spring connecting the operating member and pivoted shutter, and a detent on the operating member acting to hold the pivoted shutter while the spring is being energized by the operating member and releasing the pivoted shutter for its movement by the spring, substantially as described.

4. The combination with a pivoted shutter, of an operating-lever, a motor-spring connecting the operating-lever and pivoted shutter, and a detent on the operating-lever acting to hold the pivoted shutter while the spring is being energized by the operating-lever and releasing the pivoted shutter for its movement by the spring, substantially as described.

5. The combination with a shutter carrying a stop, of an operating member, a motor-spring connecting the operating member and shutter, and a detent on the operating member moving over the stop while the spring is being energized by the operating member and moved out of engagement with the stop to release the shutter, substantially as described.

6. The combination with a shutter carrying a stop projecting from the face of the shutter, of an operating member moving parallel with the shutter, a motor-spring connecting the operating member and shutter, and a detent on the operating member moving over the stop while the spring is being energized by the operating member and moved out of engagement with the stop to release the shutter, substantially as described.

7. The combination with a pivoted shutter carrying a stop, of an operating-lever, a motor-spring connecting the operating-lever and pivoted shutter, and a detent on the operating-lever moving over the stop while the spring is being energized by the operating-lever and moved out of engagement with the stop to release the pivoted shutter, substantially as described.

8. The combination with a shutter carrying stops, of an operating member, a motor-spring connecting the operating member and shutter arranged to be put under tension by the movement of the operating member in either direction, and a detent on the operating member coacting with the stops to hold and release the shutter on movement of the operating member in either direction, substantially as described.

9. The combination with a shutter carrying stops, of an operating member, a motor-spring connecting the operating member and shutter arranged to be put under tension by the movement of the operating member in either direction, and a detent on the operating member coacting with one of the stops to hold and release the shutter when the operating member is moved, and engaging the other stop to lock the shutter against return movement till the operating member is moved in the opposite direction, substantially as described.

10. The combination with a shutter carrying stops, of an operating member, a motor-spring connecting the operating member and shutter arranged to be put under tension by the movement of the operating member in either direction, a detent on the operating member coacting with the stops to hold and release the shutter on movement of the operating member in either direction, a time-exposure stop arranged to engage one of said stops, and another stop on the shutter coacting with said detent on the movement of the operating member for closing the shutter after time exposure, substantially as described.

11. The combination with a shutter carrying stops, of an operating member, a motor-spring connecting the operating member and shutter arranged to be put under tension by the movement of the operating member in either direction, a detent on the operating member coacting with the stops to hold and release the shutter on movement of the operating member in either direction, a time-exposure stop arranged to engage one of said stops on movement of the shutter from either of its normal positions, and stops on the shutter coacting with said detent on the movement of the operating member in either direction for closing the shutter after time exposure, substantially as described.

12. The combination with the diaphragm of a photographic shutter, of a shutter-plate pivoted thereon and having upward projections, a lever pivoted to the diaphragm, a plate on the lever adapted to have a sliding engagement with said projections, a spring to actuate the shutter-plate, and a bar having a sliding connection to the diaphragm and adapted to be moved into the path of travel of the said projections on the shutter-plate to arrest the movement of the latter for time exposures, substantially as described.

13. The combination with a pivoted shutter having projections, of a lever, a plate on the lever adapted to have a sliding engagement with the projections on the shutter, a spring to actuate the shutter, and a movable stop adapted to be moved into the path of travel of the projections on the shutter to arrest the movement of the latter for time exposures, substantially as described.

14. The combination with a pivoted shutter-plate provided with upward projections and having a portion upturned at an angle to the plate and provided with a hole, of a lever, a plate on the lever adapted to slidingly engage the upward projections on the shutter-plate, and a spring secured at one end to the lever and with its other end passing through the hole in the upturned portion of the shutter-plate, substantially as described.

15. The combination with the diaphragm of a photographic shutter, of a sector-shaped shutter-plate pivoted to the diaphragm and provided with upward projections and having a portion upturned at an angle to the shutter-plate and provided with a hole, of a lever pivoted to the diaphragm, a stop-plate on the inner end of the lever adapted to slidingly engage said projections, and a spring secured at one end to the lever with its other end passing through the hole in the upturned portion of the shutter-plate, substantially as described.

16. The combination with the diaphragm of a photographic shutter, of a shutter-plate pivoted thereon, a lever pivoted to the diaphragm, a spring secured at one end to the lever and having a loose engagement with the shutter-plate, and devices on the lever and shutter-plate adapted to have temporary sliding engagement during the movement of the lever, whereby the movement of the shutter is arrested and torsion imparted to the spring by the movement of the lever, substantially as described.

17. The combination with a pivoted shutter of a lever, a spring secured at one end to the lever and having a loose engagement with the shutter, and devices on the lever and shutter acting to hold the pivoted shutter while the spring is being energized by the lever and release the pivoted shutter for its movement by the spring, substantially as described.

18. The combination of the pivoted shutter B having stops $a$, $b$, operating-lever D having detent $e$, and motor-spring 12 connecting the lever and shutter, substantially as described.

19. The combination of the pivoted shutter B having stops $a$, $b$, operating-lever D having detent $e$, motor-spring 12 connecting the lever and shutter, and stops limiting the movement of the shutter in both directions, substantially as described.

20. The combination of the pivoted shutter B having stops $a$, $b$ and one or more time-exposure stops, as $c$, $c'$, of operating-lever D having detent $e$, motor-spring 12 connecting the lever and shutter and time-exposure stop $f$, substantially as described.

21. The combination of the pivoted shutter B having stops $a$, $b$, and one or more time-exposure stops, as $c$, $c'$, of operating-lever D having detent $e$, motor-spring 12 connecting the lever and shutter, time-exposure stop $f$ and one or more stops limiting the movement of the shutter for closing the lens-opening, substantially as described.

In testimony whereof I have hereunto set my hand in the presence of two subscribing witnesses.

FREDERICK H. KELLEY.

Witnesses:
C. J. SAWYER,
A. L. KENT.